US008793427B2

(12) United States Patent
Lim et al.

(10) Patent No.: US 8,793,427 B2
(45) Date of Patent: Jul. 29, 2014

(54) REMOTE MEMORY FOR VIRTUAL MACHINES (75) Inventors: Kevin T. Lim, Ann Arbor, MI (US);
Jichuan Chang, Sunnyvale, CA (US);
Jose Renato G. Santos, San Jose, CA (US); Yoshio Turner, San Francisco, CA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 13/024,619

(22) Filed: Feb. 10, 2011

(65) Prior Publication Data
US 2012/0210042 A1 Aug. 16, 2012

(51) Int. Cl.
*G06F 12/00* (2006.01)

(52) U.S. Cl.
USPC ................ 711/6; 711/E12.053; 711/E12.069; 711/159

(58) Field of Classification Search
USPC ............................................................ 711/6
See application file for complete search history.

(56) References Cited

U.S. PATENT DOCUMENTS

| 2002/0013802 | A1  | 1/2002  | Mori et al.         |
| 2003/0120751 | A1  | 6/2003  | Husain et al.       |
| 2009/0150529 | A1  | 6/2009  | Tripathi            |
| 2010/0070677 | A1* | 3/2010  | Thakkar ....... 711/6|
| 2010/0262974 | A1  | 10/2010 | Uyeda               |

FOREIGN PATENT DOCUMENTS

WO  WO 2010/002411  1/2010
WO  WO 2011/002436  1/2011

OTHER PUBLICATIONS

Unknown., "Cisco Unified Computing System Extended Memory Technology Overview", Retrieved from http://www.cisco.com/en/US/prod/collateral/ps10265/ps10280/ps10300/white_paper_c11-525300.html, Published: 2009, 11 pages.
Unknown., "New Datacenter Solutions from Dell Deliver Efficiency and Performance without Compromise", Retrieved from http://content.dell.com/us/en/corp/d/press-releases/2010-6-9-q2enterpriselaunch.aspx, Published: Sep. 6, 2010, Round Rock, Texas, 3 pages.
Chang, et al, "Partitioning a Memory Pool Among Plural Computing Nodes", U.S. Appl. No. 12/243,657, filed Oct. 1, 2008, 22 pages.
Deshpande, et al., Memx: Virtualization of cluster-wide memory. In ICPP'10: Proceedings of the 39th International Conference on Parallel Processing (2010), pp. 663-672.
Ye, et al., Prototyping a hybrid main memory using a virtual machine monitor. In ICCD (2008), IEEE, pp. 272-279.

* cited by examiner

*Primary Examiner* — Reginald Bragdon
*Assistant Examiner* — Hamdy S Ahmed (57) ABSTRACT Remote memory can be used for a number idle pages located on a virtual machine. A number of idle pages can be sent to the remote memory according to a placement policy, where the placement policy can include a number of weighting factors. A hypervisor on a computing device can record a local size and a remote page fault frequency of the number of virtual machines. The hypervisor can scan local memory to determine the number of idle pages and a number of idle virtual machines. The number of idle pages, including a page map and a remote address destination for each idle page, can be sent to the remote memory by the hypervisor. The number of virtual machines can be analyzed to determine a per-virtual machine local memory allocation.

15 Claims, 6 Drawing Sheets

REMOTE MEMORY FOR VIRTUAL MACHINES

BACKGROUND

Virtual machines may be limited by resources and abstractions provided by a host machine. Virtual machines may be memory constrained by their allocation of memory. Memory constrained virtual machines may use a larger number of servers and resources to accomplish the same results as a real machine. However, virtual machines may be consolidated to reduce the number of physical servers and increase resource utilization.

DETAILED DESCRIPTION

The present disclosure provides methods, systems, and machine readable media for using remote memory for virtual machines. A number of idle pages can be sent to the remote memory according to a placement policy, where the placement policy can include a number of weighting factors. A hypervisor on a computing device can record a local size and a remote page fault frequency of the number of virtual machines. The hypervisor can scan local memory to determine the number of idle pages and a number of idle virtual machines. The number of idle pages, including a page map and a remote address destination for each idle page, can be sent to the remote memory by the hypervisor. The number of virtual machines can be analyzed to determine a per-virtual machine local memory allocation.

In the present disclosure, reference is made to the accompanying drawings that form a part hereof, and in which is shown by way of illustration how a number of examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures can be identified by the use of similar digits. For example, 514 can reference element "14" in FIG. 5, and a similar element can be referenced as 614 in FIG. 6. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
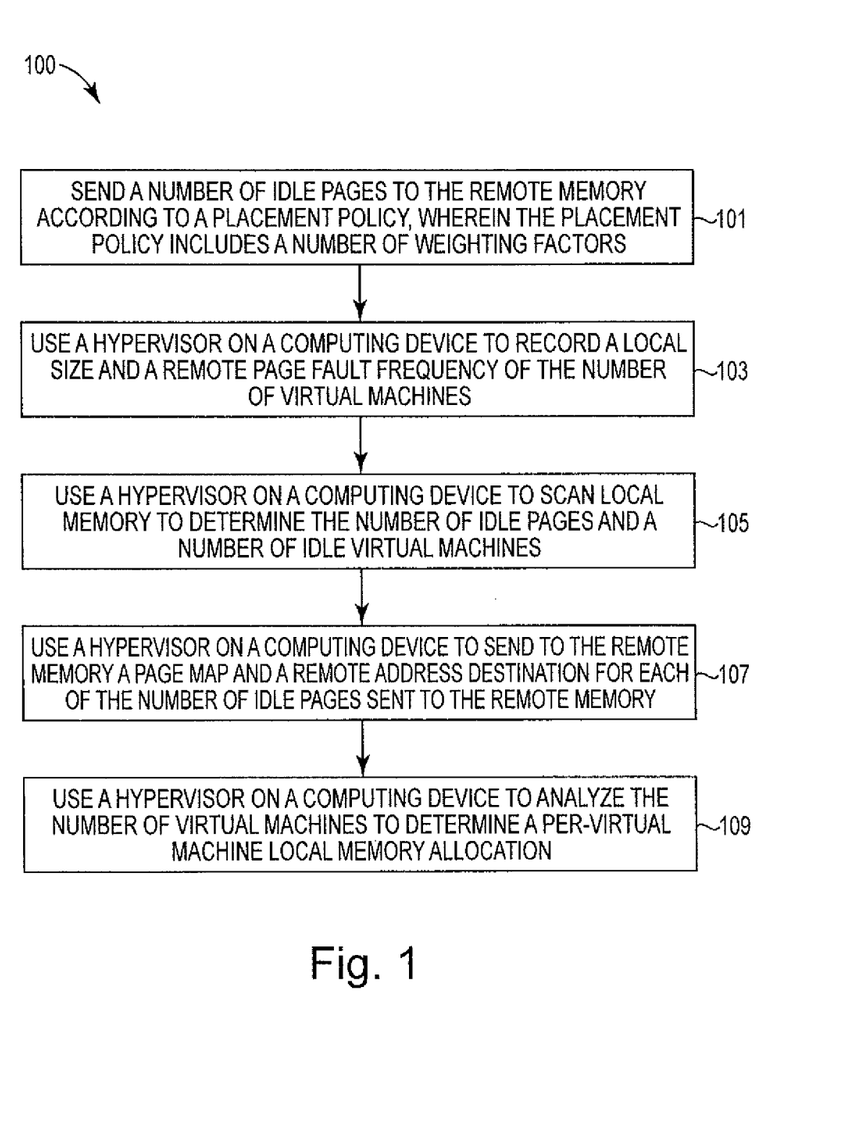
FIG. 1 illustrates an example of a method for using remote memory for a number of virtual machines.

FIG. 1 is a flow chart illustrating a method 100 for using remote memory for a number of virtual machines. Examples of the present disclosure are not limited to the steps illustrated in FIG. 1. For example, remote memory can be used as a backing store to local memory in order to free local memory on a virtual machine. Using remote memory as a backing store allows additional virtual machines to be consolidated onto a single server. Such examples can be beneficial in providing a disaggregated memory design, which uses a separate memory to provide a remote capacity shared across multiple servers. In such an example the remote memory provides expanded capacity for servers. The remote memory can store pages that are not currently used in local memory on the virtual machine, but may be used in the future. An example of a page not currently used, is a page on an idle virtual machine or a page in which an accessed bit has not been set. An idle virtual machine can, for example, be a suspended virtual machine or a virtual machine marked as idle by a hypervisor. An accessed bit is set by a processor upon access to the page and indicates the page is not idle. A remote memory, for example, can include a memory blade.

Mechanisms for virtual machine consolidation may be memory resource limited. Unlike a computer processing unit (CPU), which can time-share across multiple virtual machines, the memory must be allocated to every virtual machine. Some methods of overcommitting memory have a significant performance penalty associated with placing pages on a disk (e.g., solid-state drive (SSD) or rotational media) and retrieving pages. These types of consolidation methods can create memory constrained environments in which a disk (e.g., SSD or rotational media) dictates the amount of memory allocated for each virtual machine, regardless of activity.

The method can include sending a number of idle pages to the remote memory according to a placement policy with a number of weighting factors at step 101. A hypervisor can be used to record a local size and a remote page fault frequency of the number of virtual machines at step 103. Such examples can be advantageous by reducing and/or eliminating a requirement for a separate mode to start recording a working set prior to virtual machine check-pointing and/or continuously running the virtual machine after the checkpoint and recording what pages are accessed. A scan can be done of local memory to determine the number of idle pages and a number of idle virtual machines at step 105. Such examples can be beneficial in providing a list of entirely idle virtual machines, which can then be sent to the remote memory, consequently increasing achievable virtual machine consolidation (e.g., by freeing up local dynamic random access memory (DRAM)) and balancing performance impact from using remote memory. A page map and remote address destination are sent to the remote memory for each idle page sent to the remote memory at step 107. A page map can include a listing of a virtual machine's physical pages, and whether they physical pages are stored in local memory or remote memory. Such a page map example can be beneficial because the record of which pages are in local memory, prior to transfer to remote memory, can be used so that when a virtual machine is resumed the pages that will likely be needed in local memory will be known and can be transferred back to the local memory. A remote address destination can include the accessible address at which the virtual machine can retrieve the moved idle page. The method can include, for example, a controller of the remote memory to record the page map and the remote address destination for each of the number of idle pages sent to the remote memory. The number of virtual machines can be analyzed at step 109 to determine a per-virtual machine local memory allocation. Such examples can be beneficial in providing for faster and more accurate resizing to permit virtual machine consolidation.

Figure 2:
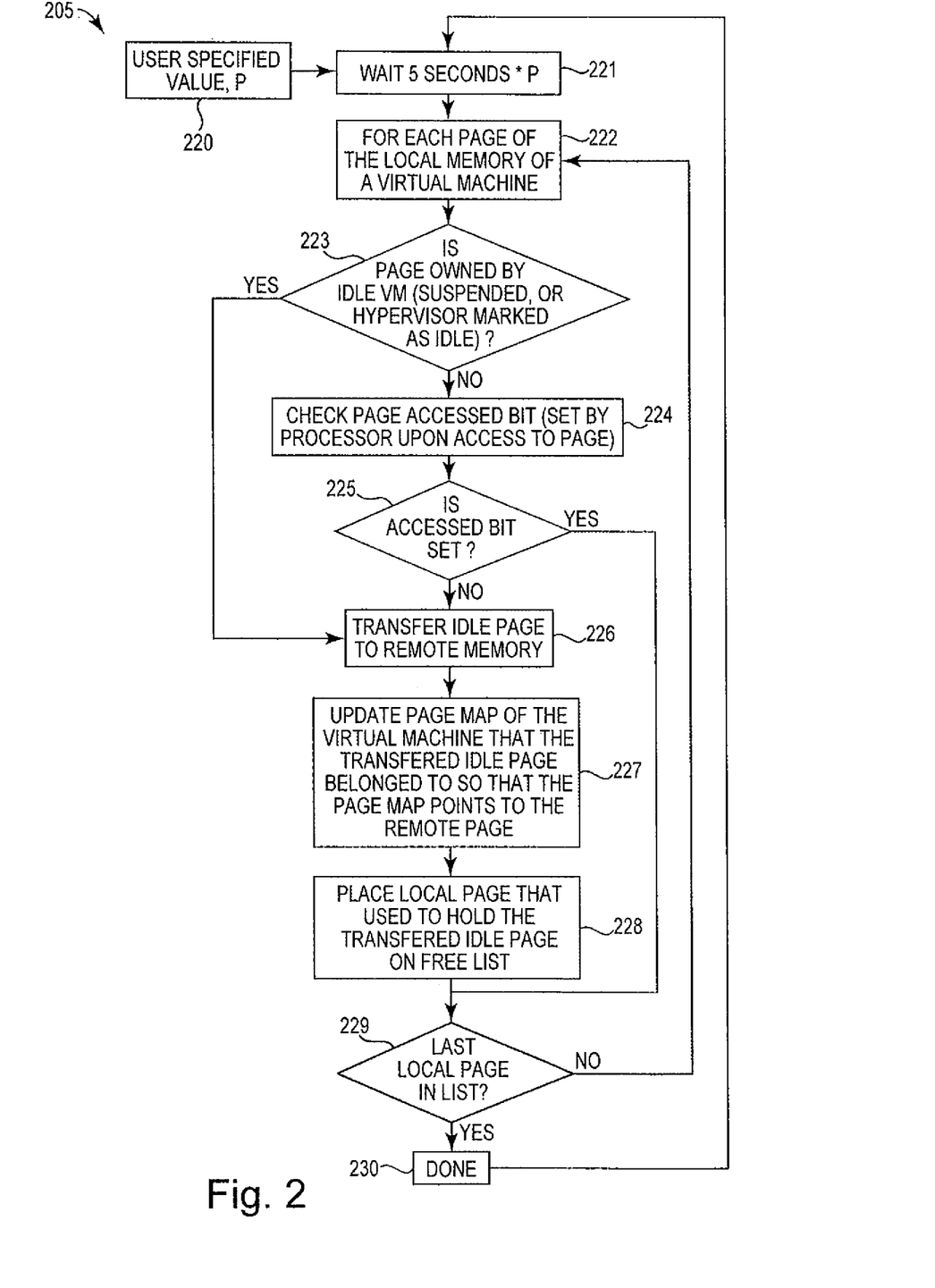
FIG. 2 provides a flow chart illustrating an example of a method for using a configurable parameter to determine scanning frequency to detect idle pages to remove and send to remote memory.

FIG. 2 is a flow chart illustrating an example of a method 205 for using a configurable parameter to determine scanning frequency to detect idle pages to remove and send to remote memory. A weighting factor, for example, that can be used in the placement policy is the local size of each of the number of virtual machines to adjust the frequency of the scans of the local memory. Using such an example of a weighting factor can beneficially provide for a balance between performance and free local memory for virtual machine consolidation. A user can specify a value of the configurable parameter, P, at step 220. The method can include a step 221 to wait, for example, five (5) seconds multiplied by the configurable parameter P before moving on to step 222 which can tell the placement policy to conduct the following steps 223-230 for each page of a local memory of a virtual machine. In such an example a higher P value, specified by the user, will decrease the frequency of the scans of the local memory. The method can include a step 223 to determine if a page is owned by an idle virtual machine (e.g., a suspended virtual machine or a virtual machine marked as idle by the hypervisor). Such an example can advantageously provide increased virtual machine consolidation (e.g., a decrease in the local footprint of each virtual machine) by permitting bulk transfers of idle pages located on an idle virtual machine. If the results of step 223 are affirmative the method can include instructions to proceed to step 226. If the results of step 223 are negative the method can include instructions to proceed to step 224. Step 224, for example, can check a page accessed bit which is set by a processor upon accessing the page being analyzed. Step 225, for example, can determine if the accessed bit is set (e.g., determine if the page is non-idle). Steps 224 and 225 are two examples of how to determine if a page is idle or non-idle and can be replaced by other policies. If step 225 determines the accessed bit is not set, the method can proceed to step 226. If step 225 determines the accessed bit is set the method can proceed to step 229.

At step 226 a page determined to be either on an idle virtual machine or idle (e.g., the accessed bit is not set) can be transferred to remote memory. The page map of the virtual machine that the idle page originated from can be updated so that the page map points to the remote page at step 227. A local page that used to hold the moved page can be placed on a free list at step 228. The free list can, for example, be a list of free memory pages able to be written on by the hypervisor. A determination, for example, can be made if the last page scanned is the last local page in the list at step 229. If it is determined the last page scanned is the last local page, the method can include step 230, which can indicate a full scan of the local memory has been completed and the method can proceed to a step 221 to determine when the next local memory scan can take place. If it is determined the scanned page was not the last on the list, the method can, for example, proceed to step 222.

Figure 3:
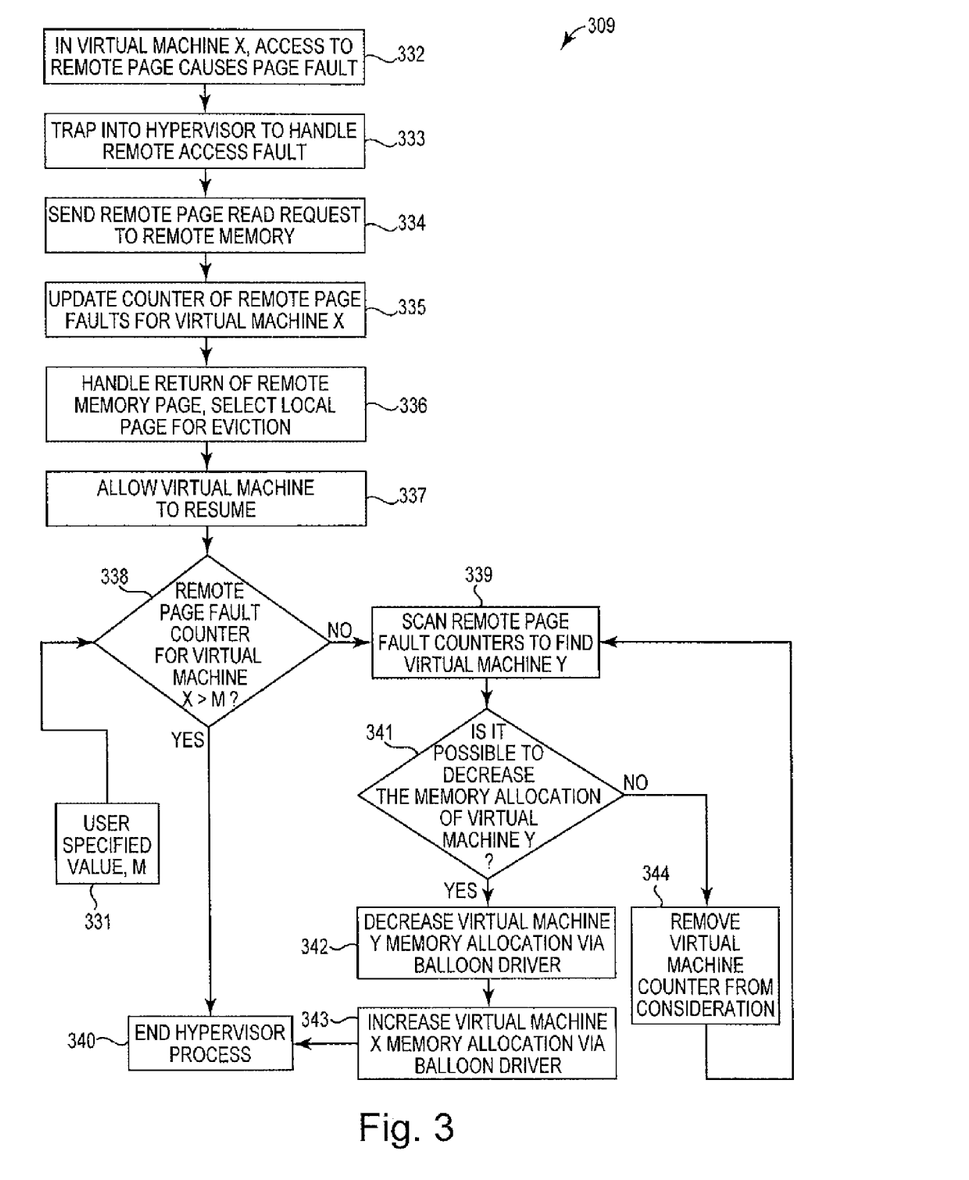
FIG. 3 provides a flow chart illustrating an example of a method for using a configurable parameter to determine when to resize virtual machine memory.

FIG. 3 is a flow chart illustrating an example of a method 309 for using a configurable parameter to determine when to resize virtual machine memory of a virtual machine X. Another weighting factor, for example, that can be used in the placement policy is the remote page fault frequency of each of the number of virtual machines to determine a threshold for adjusting the per-virtual machine local memory allocation. Such examples can be beneficial in providing for a balance between performance and free local memory for virtual machine consolidation. In the virtual machine X, access to a remote page can cause a page fault at step 332. At step 333, for example, trap into a hypervisor to handle a remote access fault can occur. A trap into a hypervisor can include a hypervisor invoked to handle a remote memory page fault. The invoked hypervisor, and not the operating system, can execute code to retrieve the remote page by sending an address of the remote page to the remote memory, and waiting for the remote memory to return the page. If no local pages are free, the hypervisor code can also select a local page to be evicted to remote memory. Once the hypervisor is done, control can be returned to the operating system. A remote page read request can be sent to a remote memory at step 334. Where the read can include a read of the data that is stored on the remote memory. The method can include an update of a counter of remote page faults of the virtual machine X at step 335. The method can include a step 336 to handle the return of a remote memory page and select a local page for eviction. Eviction can include a return of a page stored on remote memory to a virtual machine. The method can further include a step to allow the virtual machine X to resume at step 337.

At step 338 a determination can, for example, be made if the remote page fault counter for the virtual machine X is greater than a user specified value, M, designated at step 331. For example, the weighting factor M can determine the threshold for increasing allocation. Such examples can be beneficial in providing a trade-off between each virtual machines' performance with amount of local memory consumed (e.g., a lower M value allows the virtual machine to increase in size in response to lower page fault frequencies, while a higher M value allows the virtual machine to increase in size when under high page fault frequencies). If the determination at step 338 is in the negative the method can include a step 339 to scan remote page fault counters to find a virtual machine Y. Virtual machine Y can, for example, include a virtual machine with a remote page fault counter value below a threshold. In some examples, a virtual machine having a remote page fault counter with a lowest value can be selected as the virtual machine Y. The method can, at step 341, for example, include a determination if it is possible to decrease the memory allocation of the virtual machine Y. If it is not possible to decrease the memory allocation of the virtual machine Y the method can include a step 344 to remove the counter of the virtual machine Y from consideration and revisit step 339. If it is possible to decrease the memory allocation of the virtual machine Y, the memory allocation of virtual machine Y can be decreased via a balloon driver at step 342. A balloon driver can reclaim memory from virtual machines in cooperation with a guest operating system. The guest operating system can "inflate" the balloon driver to increase memory pressure within the virtual machine, and cause the guest operating system to invoke native memory management algorithms. When memory is tight, the guest operating system can decide which particular pages of memory to reclaim, and if necessary, swap them to its own virtual disk. At step 343 the memory allocation of the first virtual machine X can increase via the balloon driver by using the decreased allocation of memory from virtual machine Y at step 342. A method can, for example, also include a determination if the virtual machine memory allocation should be decreased by altering steps 342 and 343. After step 343, or a positive response to step 338, the hypervisor process can end at step 340.

Figure 4:
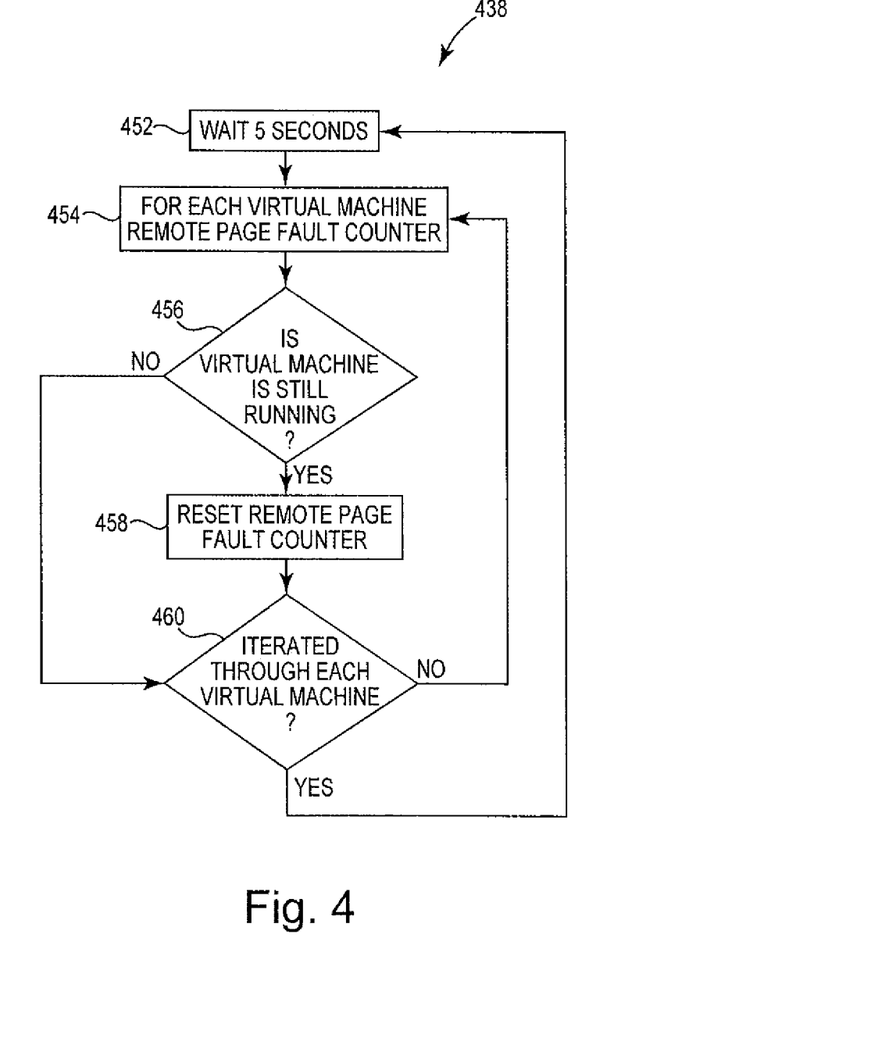
FIG. 4 provides a flow chart illustrating an example of a method for a remote page fault counter timer.

FIG. 4 is a flow chart illustrating an example of a method 438 for a remote page fault counter timer. The remote page fault counter timer, at step 454, can follow the steps of method 438 for each virtual machine remote page fault counter. The method can include a step 456 that determines if the virtual machine is still running. If the virtual machine is still running the remote page fault counter can be reset at step 458. If the virtual machine is not running, or the remote page fault counter was reset at step 458, a determination if an iteration has been done through each virtual machine at step 460 can be conducted. If iterations for virtual machines still remain, the previous steps can be repeated starting at step 454. If each virtual machine has been iterated through, the process can repeat, starting at step 454, after a time period of five (5) seconds has elapsed at step 452.

The determination of idle pages can, for example, be up to the user and their selected placement policy. An example includes using accessed bits, where pages are marked as "accessed" by the processor upon each access. When page placement decisions are made, the placement policy can consider a page with the "accessed" bit set as non-idle. Further, for example, the placement policy can consider any page with the bit cleared as idle. Then, for example, the processor can scan through memory to find the first cold page (e.g., maintain the pointer to memory across scans). As the processor scans through the pages, the set accessed bit is cleared to allow for transition from non-idle to idle pages.

In another example, the placement policy can be extended to use extra information from remote memory by using a small 2-bit counter associated with each local page. For example, when a remote page is brought in, the counter can be set to a maximum value (e.g., 3), which indicates it is a non-idle page. The same technique, for example, allows the page counter to be decremented only when the accessed bit is cleared. The new value can then be compared against a threshold to determine if the page is idle and should be selected to be moved to the local memory. The accessed bit can, for example, be reset upon checking according to a step in the placement policy.

In another example, the method can include the remote memory using the page map to bulk transfer the idle pages sent to the remote memory from a particular idle virtual machine back to the particular idle virtual machine. Such examples can be beneficial in providing for resuming idle virtual machines to decrease performance disruptions. The method can, for example, prefetch the idle pages in the page maps. The term prefetch refers to bringing in remote pages from the memory space of the virtual machine to local memory prior to being accessed. The first page of a virtual machine can be fetched on an "on demand" basis (e.g., when the page is accessed by the virtual machine becoming not idle), additional pages can also be prefetched at that time. The method can, for example, start requests, one-by-one, of previously local pages based on the saved local/remote page map. The method can prioritize local non-idle pages, based on the saved page map plus prior activity level. Such examples can be beneficial in providing a well-organized return of pages to virtual machines. The number of pages to prefetch can be configurable based on the workload. A range of the number of pages to prefetch can be from 0-10 pages, for example.

Figure 5:
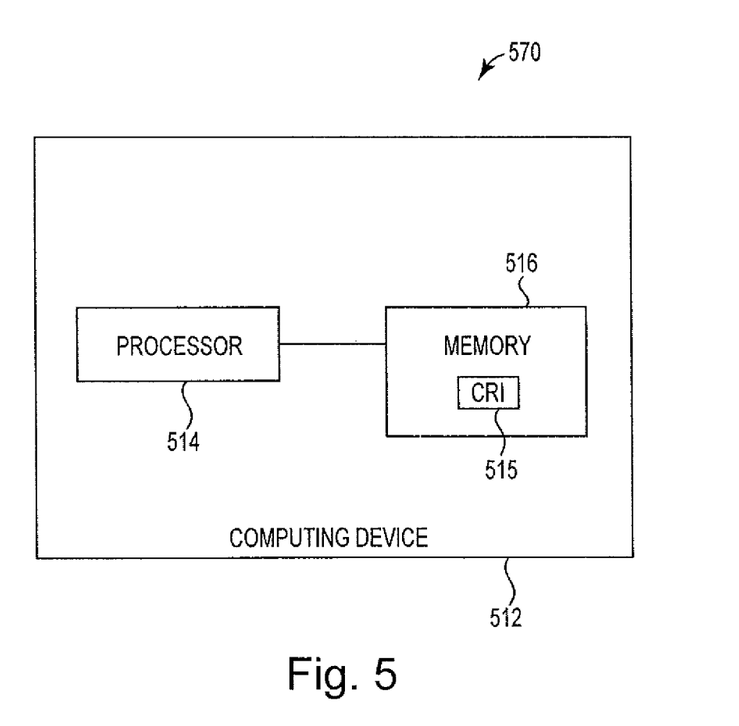
FIG. 5 illustrates a block diagram of an example of a system for using remote memory for a number of virtual machines.

FIG. 5 illustrates a block diagram of an example of system to use remote memory for a number of virtual machines according to the present disclosure. The system 570 can include a computing device 512 including a processor 514 coupled to a memory 516 (e.g., volatile memory and/or non-volatile memory). The memory 516 can include computer-readable instructions (e.g., software) 515 for developing a population category hierarchy. In an example, the processor 514 coupled to the memory 516 can send a number of idle pages to the remote memory according to a placement policy, where the placement policy includes a number of weighting factors. In an example, the processor 514 can also use a hypervisor to record a local size and a remote page fault frequency of the number of virtual machines. The processor 514 can, for example, also use the hypervisor to scan local memory to determine the number of idle pages and a number of idle virtual machines.

In an example, the processor 514 coupled to the memory 516 can use the hypervisor to send to the remote memory a page map and a remote address destination for each of the number of idle pages to the remote memory. The processor 514, for example, can analyze the number of virtual machines to determine a per-virtual machine local memory allocation. In an example, the processor 514 coupled to the memory 516 can use the hypervisor to record page information, including an activity level of the number of idle pages. The processor 514 can use the hypervisor to prioritize return of the number of idle pages to the local memory based on the activity level.

Figure 6:
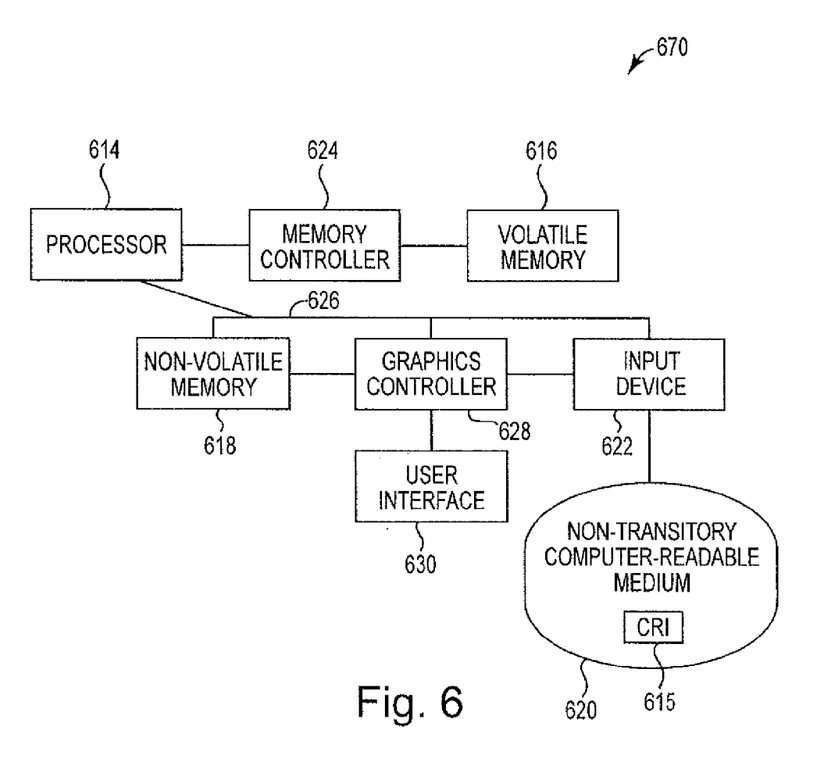
FIG. 6 illustrates a block diagram of an example of a computing system for using remote memory for a number of virtual machines.

FIG. 6 illustrates a block diagram of an example of a computing system 670 to use remote memory for a number of virtual machines according to the present disclosure. However, examples of the present disclosure are not limited to a particular computing system configuration. The system 670 can include processor resources 614 and memory resources (e.g., volatile memory 616 and/or non-volatile memory 618) for executing instructions stored in a tangible non-transitory medium (e.g., volatile memory 616, non-volatile memory 618, and/or computer-readable medium 620) and/or an application specific integrated circuit (ASIC), including logic configured to perform various examples of the present disclosure. A computer (e.g., a computing device) can include and/or receive a tangible non-transitory computer-readable medium 620 storing a set of computer-readable instructions (e.g., software) via an input device 622. As used herein, processor resources 614 can include one or a plurality of processors such as in a parallel processing system. Memory resources can include memory addressable by the processor resources 614 for execution of computer-readable instructions. The computer-readable medium 620 can include volatile and/or non-volatile memory such as random access memory (RAM), magnetic memory such as a hard disk, floppy disk, and/or tape memory, a solid-state drive (SSD), flash memory, phase change memory, etc. In some examples, the non-volatile memory 618 can be a database including a plurality of physical non-volatile memory devices. In various examples, the database can be local to a particular system or remote (e.g., including a plurality of non-volatile memory devices 618).

The processor resources 614 can control the overall operation of the system 670. The processor resources 614 can be connected to a memory controller 624, which can read and/or write data from and/or to volatile memory 616 (e.g., RAM). The memory controller 624 can include an ASIC and/or a processor with its own memory resources (e.g., volatile and/or non-volatile memory). The volatile memory 616 can include one or a plurality of memory modules (e.g., chips).

The processor resources 614 can be connected to a bus 626 to provide for communication between the processor resources 614, and other portions of the system 670. The non-volatile memory 618 can provide persistent data storage for the system 670. The graphics controller 628 can connect to a user interface 630, which can provide an image to a user based on activities performed by the system 670.

Each system can include a computing device including control circuitry such as a processor, a state machine, an ASIC, controller, and/or similar machine. The control circuitry can have a structure that provides a given functionality, and/or execute computer-readable instructions that are stored on a non-transitory computer-readable medium (e.g. non-transitory computer-readable medium 620). The non-transitory computer-readable medium can be integral, or communicatively coupled, to a computing device, in either a wired or wireless manner. For example, the non-transitory computer-readable medium 620 can be an internal memory, a portable memory, a portable disk, or a memory located internal to another computing resource (e.g., enabling the computer-readable instructions to be downloaded over the Internet). The non-transitory computer-readable medium 620 can have computer-readable instructions 615 stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid-state media such as flash memory, electronically erasable programmable read-only memory (EEPROM), phase change random access memory (PCRAM), among others. The non-transitory computer-readable medium can include optical discs, digital video discs (DVD), Blu-Ray Discs, compact discs (CD), laser discs, and magnetic media such as tape drives, floppy discs, and hard drives, solid-state media such as flash memory, EEPROM, phase change random access memory (PCRAM), as well as other types of computer-readable media.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The term "a number of" is meant to be understood as including at least one but not limited to one. The phrase "in an example," as used herein does not necessarily refer to the same example, although it can.

What is claimed:

1. A method for using remote memory for a number of virtual machines, comprising:
    sending a number of idle pages to the remote memory according to a placement policy, wherein the placement policy includes a number of weighting factors; and
    using a hypervisor on a computing device to:
        record a local size and a remote page fault frequency of the number of virtual machines;
        scan local memory to determine the number of idle pages and a number of idle virtual machines;
        send to the remote memory a page map and a remote address destination for each of the number of idle pages sent to the remote memory; and
        analyze the number of virtual machines to determine a per-virtual machine local memory allocation.

2. The method of claim 1, wherein the method further comprises using as one of the number of weighting factors the local size of each of the number of virtual machines to adjust a frequency of the scans of the local memory.

3. The method of claim 1, wherein the method further comprises using as one of the number of weighting factors the remote page fault frequency of each of the number of virtual machines to determine a threshold for adjusting the per-virtual machine local memory allocation.

4. The method of claim 1, wherein the method further comprises a controller of the remote memory recording the page map and the remote address destination for each of the number of idle pages sent to the remote memory.

5. The method of claim 1, wherein the method further comprises the remote memory using the page map to bulk transfer the idle pages sent to the remote memory from a particular idle virtual machine back to the particular idle virtual machine.

6. The method of claim 1, further comprising:
    recording page information, including an activity level of the number of idle pages; and
    prioritizing returning the number of idle pages to the local memory based on the activity level.

7. The method of claim 1, the method further comprising prefetching the idle pages in the page maps.

8. The method of claim 1, wherein the remote memory is a memory blade.

9. A non-transitory computer-readable medium storing a set of instructions executable by a processor to:
    send a number of idle pages to the remote memory according to a placement policy, wherein the placement policy includes a number of weighting factors; and
    use a hypervisor on a computing device to:
        record a local size and a remote page fault frequency of the number of virtual machines;
        scan local memory to determine the number of idle pages and a number of idle virtual machines;
        send to the remote memory a page map and a remote address destination for each of the number of idle pages sent to the remote memory;
        analyze the number of virtual machines to determine a per-virtual machine local memory allocation;
        record page information, including an activity level of the number of idle pages; and
        prioritize return of the number of idle pages to the local memory based on the activity level.

10. The medium of claim 9, wherein the medium further comprises instructions to use as one of the number of weighting factors the local size of each of the number of virtual machines to adjust a frequency of the scans of the local memory.

11. The medium of claim 9, wherein the medium further comprises instructions to use as one of the number of weighting factors the remote page fault frequency of each of the number of virtual machines to determine a threshold for adjusting the per-virtual machine local memory allocation.

12. The medium of claim 9, wherein the medium further comprises instructions for the remote memory to use the page map to bulk transfer the idle pages sent to the remote memory from a particular idle virtual machine back to the particular idle virtual machine.

13. A system to use remote memory for a number of virtual machines, comprising:
- a computing device including:
  - a memory; and
  - a processor coupled to the memory, to:
    - send a number of idle pages to the remote memory according to a placement policy, wherein the placement policy includes a number of weighting factors; and
    - use a hypervisor on a computing device to:
      - record a local size and a remote page fault frequency of the number of virtual machines;
      - scan local memory to determine the number of idle pages and a number of idle virtual machines;
      - send to the remote memory a page map and a remote address destination for each of the number of idle pages sent to the remote memory;
      - analyze the number of virtual machines to determine a per-virtual machine local memory allocation;
      - record page information, including an activity level of the number of idle pages; and
      - prioritize return of the number of idle pages to the local memory based on the activity level.

14. The system of claim 13, wherein the number of weighting factors comprises a weighting factor of the local size of each of the number of virtual machines to adjust a frequency of the scans of the local memory.

15. The system of claim 13, wherein the number of weighting factors comprises a weighting factor of the remote page fault frequency of each of the number of virtual machines to determine a threshold for adjusting the per-virtual machine local memory allocation.

\* \* \* \* \*